Nov. 30, 1943.    M. A. ROGGENKAMP    2,335,792
SLIDE RULE
Filed April 2, 1941    2 Sheets-Sheet 1
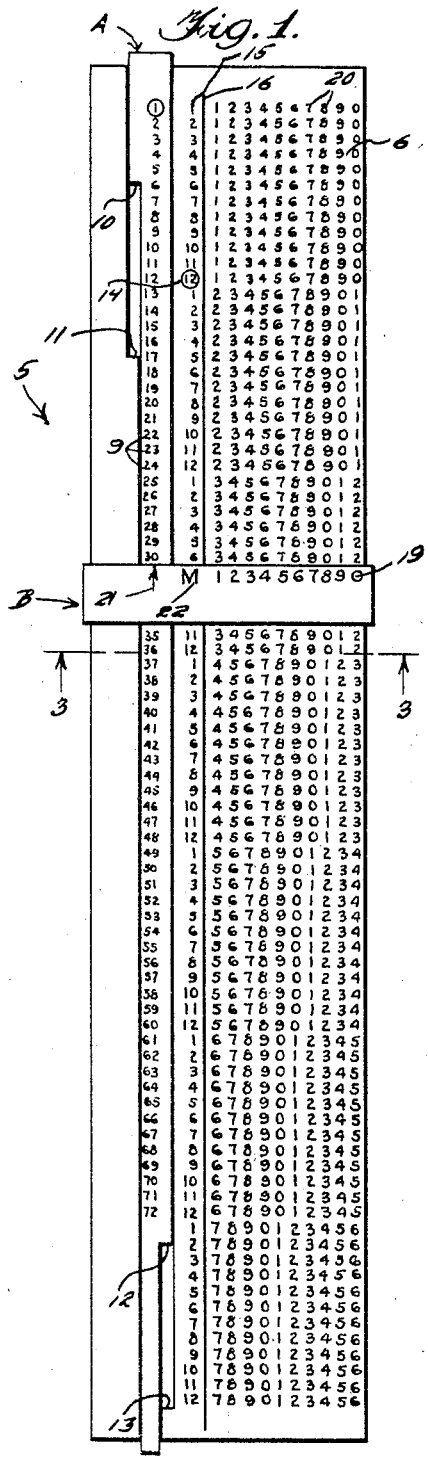
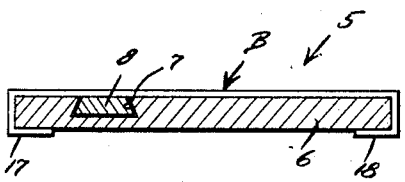
Inventor
MATTHIAS A. ROGGENKAMP
By Clarence A. O'Brien
Attorney Nov. 30, 1943.　　M. A. ROGGENKAMP　　2,335,792
SLIDE RULE
Filed April 2, 1941　　2 Sheets-Sheet 2

Inventor
MATTHIAS A. ROGGENKAMP
By Clarence A. O'Brien
Attorney

Patented Nov. 30, 1943

2,335,792

UNITED STATES PATENT OFFICE 2,335,792

SLIDE RULE

Matthias A. Roggenkamp, Belmont, Mass.

Application April 2, 1941, Serial No. 386,516

1 Claim. (Cl. 235—88)

My invention relates to improvements in slide rules useful for computing time, particularly with reference to calculating monthly instalment payments or allotments of pay especially of military service personnel, and the primary object of my invention is to provide simple and efficient slide rules of this character of substantially perpetual scope.

Other important objects and advantages of my invention will be apparent from a reading of the following description and the appended drawings, wherein for illustrative purposes, preferred embodiments of my invention are shown.

In the drawings—

Figure 1 is a plan view of the preferred embodiment of the invention showing the main slide in initial position and the transverse slide in a selected intermediate position.

Figure 2 is an edge elevational view.

Figure 3 is an enlarged transverse sectional view taken through Figure 1 along the line 3—3 and looking in the direction of the arrows.

Figure 4:
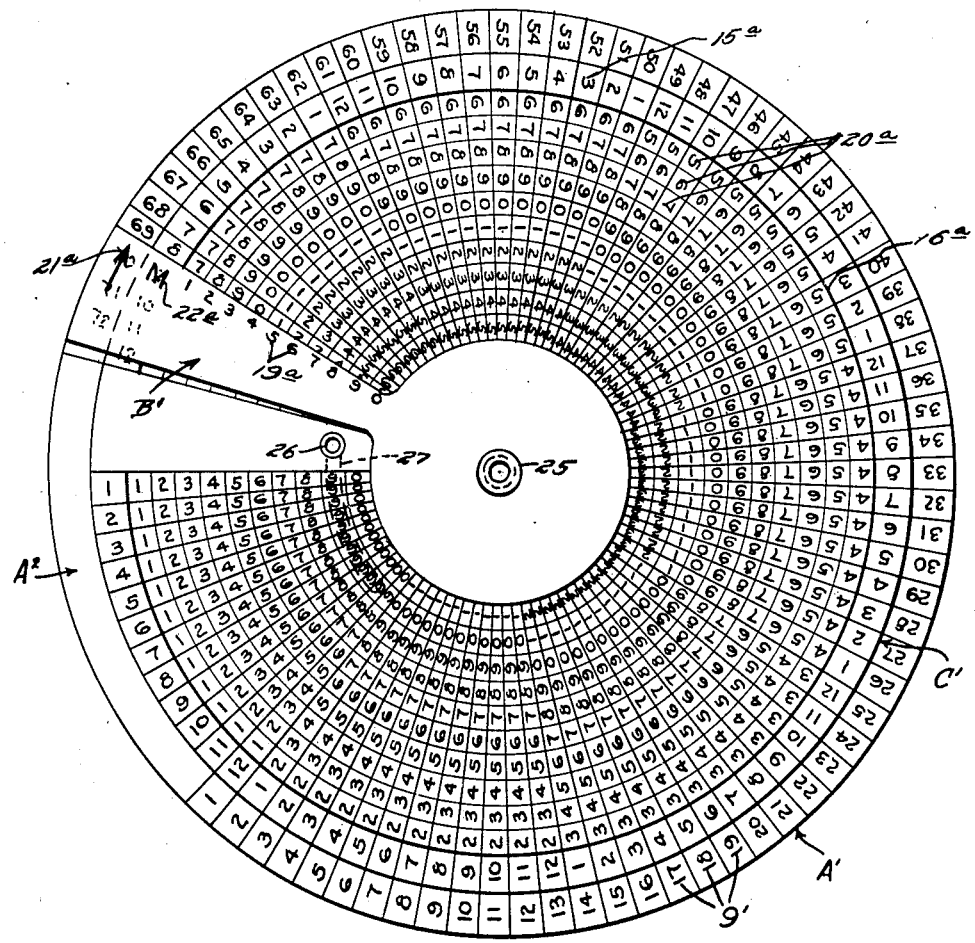
Figure 4 is a plan view of another embodiment of my invention.

Referring in detail to the drawings and first to Figures 1 through 3 thereof, the numeral 5 generally designates the elongated rectangular type of slide rule, consisting of an elongated rectangular plate 6 of suitable material, preferably although not necessarily about 10 inches long, 2½ inches wide, and ¼ inch thick, formed with a longitudinal slide retaining groove 7 having bevelled edges in which is slidably confined the main slide "A."

The main slide "A" is provided on its face with a longitudinal series of equally spaced numbers or numerals 9, reading downwardly from "1" to "72," in this case, representing the number of months in six years. The numeral "1" should be red in color or otherwise distinctly wrought, and the slide "A" and groove 7 formed with cooperating pairs of stop shoulders 10, 11 and 12, 13, respectively, to prevent the slide "A" from being moved downwardly farther than the point at which the numeral "1" on the slide "A" lines up horizontally with the similarly distinctive numeral "twelve," here having the designating numeral 14, in the column 15 of figures on the plate 6 to the left of the longitudinal line 16. The column 15 is made up of longitudinal series running from "one" to "twelve" with the figures thereof equally longitudinally spaced like the numerals of the slide "A."

The transverse slide "B" is made of a flat piece of thin metal or other suitable material bent at its opposite ends to slidably and conformably embrace the edges of the rule plate 6, as indicated in Figure 3 of the drawings at 17 and 18, respectively, so as to be slidable from one end to the other of the rule 6.

A horizontal row 19 of ten numerals running from left to right from "one" to "zero" is wrought in contrasting fashion on the slide "B," and these are hereinafter referred to as "first year indicators." These ten numerals are exactly vertically aligned with a corresponding number of vertical columns 20 composed of series of numbers or numerals, and arranged to the right of the dividing line 16.

The column 15 to the left of the line 16 is composed of vertical series of numbers running downwardly from "one" to "twelve." The columns 20 to the right of the line 16 considered collectively are made up of vertical series each composed of twelve similar horizontal rows of numerals from "one" to "zero." The topmost series leads off with "one," the next with "two," the next with "three" and so on downwardly.

The slide "B" has an arrow 21 aligned with the column of figures on the slide "A" and a letter "M" aligned with the column 15 on the rule plate 6, whose purposes are explained below.

Each numeral of the column 15 of the rule represents a corresponding month of the year, viz. "1" is January, "2" is February, and so on. There are illustrated seven series or groups of twelve months each, the figures being hereinafter referred to as "month indicators," and the first or uppermost group being specifically designated as "first month indicators."

Each numeral in each horizontal row to the right of the dividing line 16 represents the last digit of a calendar year and it is to be noted that the first twelve rows begin with "one" and end with "zero," while the next below group of twelve rows begin with "two" and end with "one," and so on, for a purpose appearing hereinafter.

The present slide rule is "perpetual" as to years, in that only the last digit of any year is used, omitting the first three digits. For example, taking the next to last column 20 on the right, and beginning with "nine" and assuming that this represents the year 1899, and reading down along this column through "nine" occurring twelve times, the numerals shift to "zero" representing the year 1900. When this is repeated the year 1901 is reached, and so on in succession.

Figure 5:
Figure 5 is an edge elevational view thereof.

If desired the present invention may be embodied instead in the circular form shown in Figures 4 and 5 of the drawings, whose operation, as explained further on herein, is very similar to the first described embodiment.

The circular form generally designated 5a herein, consists of a large circular dial A' taking the place of above described slide A, and concentric smaller dial or index arm B', taking the functional part of the slide B. This dial and arm are pivoted together at 25. Figure 4 of the drawings shows the dial and index arm adjusted to positions of the same significance as those of the slides as shown in Figure 1 of the drawings.

The second and smaller circular dial C' pivoted between the dial A' and the dial or index arm B' corresponds to the rule plate 6, these parts having the same relative arrangement of indicating numerals thereon except for their circular arrangement, as in the first described embodiment. To limit the movement of the dial C' relative to the dial A', as in the first described embodiment, a stop rivet 26 is provided which works in a curved slot 27 formed in the dial A'.

On the large dial A' is formed a circular field on band $A^2$, which corresponds to the slide A in Figures 1 and 2. This field has a width extending outwardly from the peripheral edge of the circular disk or dial C' to the corresponding edge of the large dial A' and is marked with a circularly arranged series of equally spaced numerals 9' reading from "1" to "72," here representing the number of months in six years. The numeral 1 should preferably be red and the numeral 12 of the first group of twelve numerals "month indicators" on dial C' should likewise be painted the same color. These "month indicators" are arranged between the heavy circle 16a corresponding to line 16 in Figure 1, and the outer edge of the small disk C', in groups of twelve months each. Each numeral in each radial row from the heavy line 16a toward the center, represents the last digit of a calendar year and it should be noted that the first twelve radial rows begin with numeral "1" and end with "0" and the next twelve rows begin with "2" and end with "1" and so on.

Examplary instructions for operation of the two embodiments, which should be printed on the backs thereof, are set forth below to illustrate their use and operation, as follows:

*I. Periods within limitations of a single column of the rule*

(1) To find the month and year of last charge or payment, when the first month and year and number of months' duration are known, it being desired to register payments beginning July, 1939, for 33 months: Move slide "A" down until its red numeral 1 stands opposite red 7 (July) "first month indicator"; move slide "B" down until the numeral 33 on slide "A" is visible at black arrow point on slide "B"; opposite 33, in the next column will appear the numeral 3, representing the month of March, visible above the letter "M" on slide "B"; above the red numeral 9 (the last digit of the year 1939) on slide "B," will appear a black 2, which will represent the last digit of the year 1942; time goes forward, thus, from 1939 to 1940, to 1941, to 1942; therefore, the rule indicates payments will expire in March, 1942.

(2) To find the number of months when the month and year of first payment, and the month and year of last payment are known, in the case of an enlistment or enrollment expiring in September 1943, and desiring to register payments beginning in March 1940, to end August 1943 (month before expiration of enlistment or enrollment): Move slide "A" until its red numeral 1 stands opposite red 3 (March), month of the first payment; move slide "B" down until a black 3 (1943) is visible above the red 0 (1940) on slide "B," while at the same time a black 8 (August) is visible just above "M" on slide "B"; now, the numeral on slide "A" visible just above the black arrow point on slide "B" is 42; thus, payments run for 42 months, beginning in march (3), 1940 (0), and expiring in August (8), 1943 (3).

*II. For periods beyond the limitations of a single column on the rule*

As, where insurance premiums will cover a period of time greater than the six years provided on the rule; therefore, use the following supplemental table, in steps of 5 years:

5 years equals 60 months
10 years equals 120 months
15 years equals 180 months
20 years equals 240 months (1) To find the month and year of last charge or payment, when the first month and year and number of months duration are known, it being desired to register payments beginning in September 1939, for 235 months. It is readily seen this number of months will be less than 20 years but greater than 15 years, therefore, by adding 15 years to 1939 the result will be 1954; subtract 180 months from 235 months, leaving 55 months to go from September 1954; therefore, proceed from this point as in Example I (1); i. e., move slide "A" down until its red numeral 1 stands opposite red 9 (September); move slide "B" down until its black arrow points directly to the numeral 55 on slide "A"; opposite 55, in the next column will appear 3 (March) visible above the letter "M" on slide "B"; above the red numeral 4 (1954) on slide "B" will appear a black 9, which will represent the last digit of the year 1959; therefore, the rule indicates payments will expire in March, 1959.

(2) To find the number of months when the month and year of first payment and the month and year of last payment are known, it being desired to register payments beginning in August 1939, to end with last payment April 1956. This is less than 20 but more than 15 years, therefore add 15 years to 1939, bringing you to 1954; now, move slide "A" until its red numeral 1 stands opposite red 8 (August) month of first payment; move slide "B" up or down until its red 4 (1954) shows a black 6 (1956) just above it, while at the same time a black 4 (April) is visible just above "M" on slide "B"; now, the numeral on slide "A" visible just above the black arrow point on slide "B" is 21; thus, 21 months, plus the 180 months for the 15 years, equals 201 months, the duration or number of months for which payments are to be made.

(3) To find the month and year of first charge or payment when the number of months duration and the month and year of last payment are known; payments running for 235 months, ending September 1963; subtract 180 months from 235 months, and 15 years from 1963, which will leave 55 months, and, September 1948; now, move slide "B" up or down until within the vicinity of numeral 55 on slide "A," the letter "M" on slide "B" shows 9 (September) visible; now, adjust slide "A" until its numeral 55 is visible directly above the black arrow point while the "M" on slide "B" still shows a 9; the red numeral on slide "B," directly below the black 8 (1948) on face of rule, will be 4 (1944); and the red numeral 1 on slide "A" will stand opposite a red 3 (March); therefore, the rule indicates the payments started in March, 1944. It must be remembered that in this example, time was moving backward, while in the other four examples, time forward in each case.

Although I have shown and described herein preferred embodiments of my invention, it is to be definitely understood that I do not wish to limit the application of my invention thereto, except as may be required by the scope of the subjoined claim.

Having described the invention, what I claim as new is:

A time computing slide rule of the character described, said slide rule comprising a main disk formed with a circular field along its peripheral edge composed of consecutive month designating numerals, respectively, running from numeral "1" to numeral "72," an intermediate disk overlying said main disk and concentrically pivoted thereto, said intermediate disk having a diameter equal to the inner periphery of said field of said main disk so as to expose said month designating numerals, said intermediate disk being formed with one marginal field and ten concentric circles of radially decreasing diameter and said ten circles being marked with numerals arranged in radial rows to be alignable with the aforementioned month designating numerals on the main disk, the numerals of said ten circles designating the last digits of calendar years, the radial rows each carrying numerals 1 to 0, and said rows being arranged in groups of twelve of which every row of the first group commences with numeral 1, every row of the second group commences with 2, the third with 3 and so on to the seventh which commences with 7 in the circle nearest the marginal circle; and an index arm concentrically pivoted over said intermediate disk and extending radially across both disks to the outside periphery of the main disk, said index arm being formed with a radial series of ten consecutive numerals running from "one" to "zero" aligning with said ten concentric circles and positioned opposite to similar numbers in the first of said radial groups; said marginal field of the intermediate disk being confined between the edge and a heavy circle line along the largest of the ten circles and marked with seven groups of twelve consecutive numbers each, said index arm being provided with a special mark opposite the marginal field and with another special mark opposite the first mentioned circular field.

MATTHIAS A. ROGGENKAMP.